(12) United States Patent
Meriel et al.

(10) Patent No.: US 12,508,634 B2
(45) Date of Patent: Dec. 30, 2025

(54) INSTALLATION AND METHOD FOR DESTROYING PYROTECHNIC WASTE

(71) Applicant: ROXEL France, Saint-Medard En Jalles (FR)

(72) Inventors: Laurent Meriel, Saint-Medard En Jalles (FR); Roland Favre, Saint-Medard En Jalles (FR)

(73) Assignee: ROXEL FRANCE, Saint-Médard-en-Jalles (FR)

( * ) Notice: Subject to any disclaimer, the term of this patent is extended or adjusted under 35 U.S.C. 154(b) by 601 days.

(21) Appl. No.: 17/963,536

(22) Filed: Oct. 11, 2022

(65) Prior Publication Data

US 2023/0111663 A1    Apr. 13, 2023

(30) Foreign Application Priority Data

Oct. 11, 2021  (FR) .................................... 2110707

(51) Int. Cl.
*B09B 3/40*    (2022.01)
(52) U.S. Cl.
CPC ..................... *B09B 3/40* (2022.01)
(58) Field of Classification Search
None
See application file for complete search history.

(56) References Cited

U.S. PATENT DOCUMENTS

| | | | | |
|---|---|---|---|---|
| 2,057,681 A | * | 10/1936 | Harrington | F23G 5/004 34/502 |
| 4,398,998 A | * | 8/1983 | Quame | B09B 3/45 110/259 |
| 5,331,106 A | * | 7/1994 | Spas | B09B 3/70 423/130 |
| 5,458,071 A | | 10/1995 | Tadmor et al. | |
| 5,602,297 A | * | 2/1997 | Wang | B09C 1/06 588/407 |
| 6,096,283 A | * | 8/2000 | Cooper | G21F 9/06 210/759 |
| 6,112,675 A | * | 9/2000 | Potter | B09B 3/45 405/128.85 |

(Continued)

FOREIGN PATENT DOCUMENTS

| | | |
|---|---|---|
| CN | 2 738 159 Y | 11/2005 |
| CN | 106 765 254 B | 12/2018 |

(Continued)

*Primary Examiner* — John J Figueroa
(74) *Attorney, Agent, or Firm* — BakerHostetler

(57) ABSTRACT

An installation for destroying waste includes at least traces of energetic materials, comprising: an enclosure delimited by lateral walls, the enclosure being filled with a liquid medium up to a first level; a chamber comprising: an inlet intended to supply the chamber with waste to be destroyed by combustion in the chamber; an outlet; a discharge line extending between a first end and a second end, the first end being connected to the outlet of the chamber, the second end being situated in the liquid medium, the discharge line rising, between its first end and its second end, to a second level which is higher than the first level, the discharge line being configured to discharge, at the second end, gases and volatile solid residues which are produced in the chamber during combustion.

9 Claims, 3 Drawing Sheets

(56) References Cited

U.S. PATENT DOCUMENTS

| | | | | |
|---|---|---|---|---|
| 6,250,236 | B1* | 6/2001 | Feizollahi | F23G 5/008 |
| | | | | 110/211 |
| 2006/0180547 | A1* | 8/2006 | Widmer | B09B 3/65 |
| | | | | 210/631 |
| 2015/0151153 | A1* | 6/2015 | Sakamoto | F23G 7/003 |
| | | | | 110/255 |

FOREIGN PATENT DOCUMENTS

| | | |
|---|---|---|
| EP | 1 595 607 A1 | 11/2005 |
| WO | 2012/171718 A1 | 12/2012 |

\* cited by examiner

INSTALLATION AND METHOD FOR DESTROYING PYROTECHNIC WASTE

CROSS-REFERENCE TO RELATED APPLICATION

This application claims priority to foreign French patent application No. FR 2110707, filed on Oct. 11, 2021, the disclosure of which is incorporated by reference in its entirety.

FIELD OF THE INVENTION

The present invention lies in the field of disposing of high-energy-value waste, notably propellant, by burning.

BACKGROUND

The waste with which the installation and the method of the invention are concerned is waste which may take the form of propellant and/or of pyrotechnic or chemical products. This is waste comprising at least traces of energetic materials, that is to say that this waste can be defined as not being inert. In one non-limiting example of manufacturing solid propellant, waste may refer to any element which is not usable in a normal manufacturing operation, or else residues from a mechanical treatment (for example excess material). It may be propellant (crosslinked or non-crosslinked) or else any product that has been brought into contact with propellant. Waste may also refer to personal protection equipment (smock, gloves, protective glasses, mask, respiratory mask cartridges) that has been in contact, directly or indirectly, with propellant. In other words, waste comprising at least traces of energetic materials should be understood to mean any non-inert waste, that is to say comprising at least one molecule of energetic product (for example at least one molecule of propellant).

In the following text, and by way of non-limiting illustration, the invention will be described in relation to waste comprising at least traces of propellant. A person skilled in the art will understand that the invention similarly applies to other waste with a high energy value, and to which any other waste may potentially be added.

In the field of destroying energetic waste, it is imperative to comply with basic safety regulations, regulations associated with pyrotechnic safety and regulations relating to the protection of the environment.

In a solid-propellant engine, the solid propellant forms the material which, when combusted, generates gases, the ejection of which through the nozzle is responsible for propelling the vehicle in which the engine is integrated.

The dismantling of a solid-propellant engine, that is to say its final removal from service, generally consists in reducing it to a configuration such that the function for which it was designed, namely propulsion, and thus the combustion of the propellant, can no longer be carried out. The main reason for dismantling, in connection with the lifespan of motors, is safety of property, and particularly of personnel, that may be in the vicinity of this engine even after it has been scrapped. The dismantling procedure adopted, and also the means employed, generally meet various requirements, such as the simplicity of the operations carried out, or the guarantee of pyrotechnic safety (non-propagation of effects). They must also be in line with the dismantling rates imposed, that is to say with the quantity of engines to be processed during a given period of time.

The prior art proposes a number of dismantling methods which, however, are not able to meet the stringent requirements in terms of processing rates or in terms of simplicity of implementation. Moreover, the prior art proposes methods for dismantling complete engines and not any waste which can be destroyed directly.

The Applicant has expertise in the field of the clean destruction of pyrotechnic motors. For example, the Applicant's patent EP 2 721 367 describes a method for dismantling solid-propellant engines in which the engine to be dismantled is started so as to use up all of the propellant that it contains, the combustion being carried out while the engine is mounted on a static test rig which is totally immersed in a tank filled with water. Such a method guarantees a manner of dismantling which is compatible with the greatest possible number of solid-propellant engine types, and makes it possible to simplify dismantling operations and to reduce the amount of time required for this dismantling. However, this method is suitable only for engines and does not offer the possibility of destroying any pyrotechnic waste in different forms (propellant on its own, or even a smock, objects for scrapping, etc.).

Other methods for destroying such waste exist. These involve techniques of open burning without capture and treatment of gas, or of burning in an enclosure with capture and treatment of gas, or of disposal of composite propellants by chemical process, or of inerting by supercritical oxidation. The solutions are both complex and expensive to implement, and are generally adapted to a single type of waste. In addition, these methods still do not represent a satisfactory solution for protection of the environment.

SUMMARY OF THE INVENTION

The invention aims to overcome all or some of the problems cited above by proposing an installation and a method for the clean destruction, by burning, of pyrotechnic waste, which is less dependent on the nature of the waste to be processed and requires less preparation, if any, of the waste prior to burning. Moreover, in addition to accepting metallic objects and not imposing homogeneity of waste, the installation according to the invention is readily able to be used again for different types of pyrotechnic waste. Lastly, as will become apparent from the detailed description of the invention, the method consumes fewer resources. This results in a relatively low implementation cost.

To this end, a subject of the invention is an installation for destroying waste comprising at least traces of energetic materials, preferably propellant, characterized in that it comprises:
  an enclosure delimited by lateral walls, a base and a roof, the enclosure being at least partially filled with a liquid medium, preferably water, up to a first level;
  a chamber comprising:
    an inlet, said inlet being intended to supply the chamber with waste to be destroyed by combustion in the chamber;
    an outlet;
  the chamber being immersed in the liquid medium of the enclosure, the
  inlet of the chamber opening at one of the lateral walls of the enclosure, a discharge line extending between a first end and a second end, the first end being connected to the outlet of the chamber, the second end being situated in the liquid medium, preferably in the vicinity of the base of the enclosure, the discharge line rising, between its first end and its second end, to a second level which is higher than the first level, the discharge line being configured to discharge, at the second end in the liquid medium, gases and volatile solid residues which are produced in the chamber during combustion.

Advantageously, the installation for destroying waste according to the invention further comprises a treatment unit for treating the liquid medium, said treatment unit being configured to be supplied with liquid medium in which gases and volatile solid residues produced during combustion are incorporated and to dispense dry matter and treated water, which is preferably intended to be re-injected into the enclosure as liquid medium.

Advantageously, the installation for destroying waste according to the invention comprises a gas injector connected to the inlet of the chamber, the gas injector being configured to inject inert gas, preferably nitrogen, and/or air into the chamber.

Advantageously, the installation for destroying waste according to the invention comprises a device for increasing the contact time between the discharged gases and the liquid medium.

Advantageously, the device for increasing the contact time between the discharged gases and the liquid medium comprises perforated gratings which are disposed at different levels in the enclosure; following the path of the gases, starting from the lower part of the enclosure and rising up towards the upper part, the gratings successively have perforations of smaller and smaller diameter.

Advantageously, the device for increasing the contact time between the discharged gases and the liquid medium takes the form of baffles.

Advantageously, the discharge line comprises a non-return valve disposed at the second end, the non-return valve comprising a valve element configured to be movable between a closed valve position which prevents liquid medium from flowing back into the chamber, and an open valve position in which gases and volatile solid residues produced in the chamber during combustion are discharged in the liquid medium.

Advantageously, the roof of the enclosure comprises an opening intended to discharge gases which are discharged in the liquid medium and which are not incorporated in the liquid medium.

Advantageously, the installation for destroying waste further comprises a heating system for heating the chamber, said heating system not generating any chemical compounds during use thereof.

The invention also relates to a method for destroying waste comprising at least traces of energetic materials, preferably propellant, the method being implemented in an installation according to the invention, the method being characterized in that it comprises the following steps defining a destruction cycle:
  supplying the chamber with waste to be destroyed;
  combusting the waste to be destroyed in the chamber, generating gases and solid residues;
  discharging the gases and volatile solid residues via the discharge line;
  bringing the discharged gases and volatile solid residues into contact with the liquid medium at the second end of the discharge line;
  incorporating a portion of the gases and the volatile solid residues into the liquid medium.

Advantageously, the destruction method according to the invention further comprises, after the step of incorporating a portion of the gases and the volatile solid residues into the liquid medium, a step of treating the liquid medium, delivering dry matter, after evaporation, and treated water, which is preferably intended to be re-injected into the enclosure as liquid medium.

Advantageously, the destruction method according to the invention comprises a step of injecting, into the chamber, inert gas, preferably nitrogen, during the destruction cycle, and/or air at the end of the destruction cycle.

Advantageously, the destruction method according to the invention comprises a step of increasing the contact time between the discharged gases and the liquid medium after the step of bringing the discharged gases into contact with the liquid medium, during the step of incorporating a portion of the gases and the volatile solid residues into the liquid medium.

Advantageously, the destruction method according to the invention comprises a step of discharging gases which are discharged in the liquid medium and which are not incorporated in the liquid medium through an opening in the roof of the enclosure.

Advantageously, the destruction method according to the invention comprises a step of injecting inert gas into the chamber between the step of supplying the chamber with waste to be destroyed and the step of combusting the waste to be destroyed.

Advantageously, the heating system is employed to initiate combustion of the waste to be destroyed.

Advantageously, the destruction method according to the invention comprises a step of injecting air into the chamber at the end of the step of combusting the waste to be destroyed.

Advantageously, the destruction method according to the invention comprises, between the step of supplying the chamber with waste to be destroyed and the combustion step, a step of drying out the waste to be destroyed by means of a heating system for heating the chamber, said heating system not generating any chemical compounds during use thereof.

BRIEF DESCRIPTION OF THE DRAWING

The invention will be better understood and other advantages will become apparent from reading the detailed description of one embodiment given by way of example, the description being illustrated by the attached drawing in which.

For the sake of clarity, the same elements will bear the same reference signs in the various figures. For a better view and for the sake of greater understanding, the elements are not always shown to scale.

DETAILED DESCRIPTION

As indicated in the introduction of the present document, the invention applies to pyrotechnic waste, that is to say to waste comprising at least traces of energetic materials, preferably traces of propellant. In other words, this involves burnable waste. For example, pyrotechnic waste may refer to waste which has been brought into contact with a high-energy-value material, of the propellant type, which causes this waste to comprise traces of this material.

The object of the invention resides in ensuring clean destruction of any type of pyrotechnic waste by combustion, and transfer of pollutants (combustion products in the form of gas and solid residues) in a liquid medium.

Figure 1:
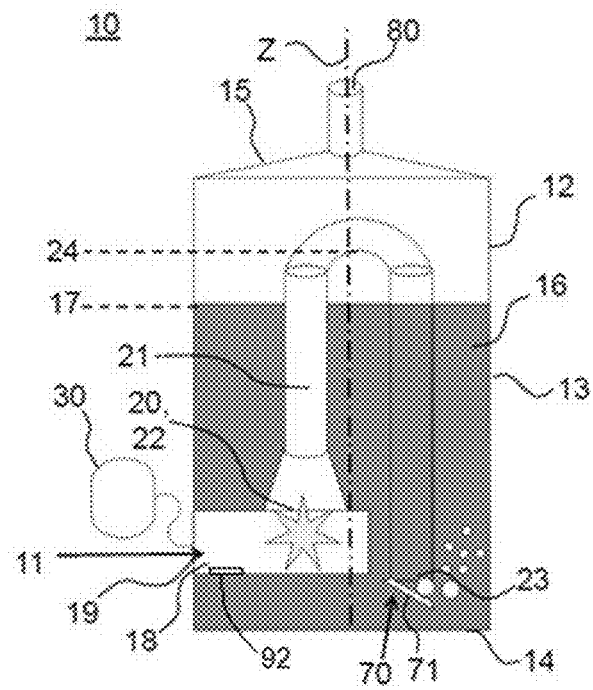
FIG. 1 schematically shows an installation for destroying pyrotechnic waste according to the principle of the invention.

FIG. 1 schematically shows an installation 10 for destroying pyrotechnic waste according to the principle of the invention. The installation 10 for destroying waste 11 comprising at least traces of energetic materials, preferably propellant, comprises an enclosure 12 delimited by lateral walls 13, a base 14 and a roof 15. By way of non-limiting example, the roof may be a cover for channeling gases which makes it possible to release carbon monoxide as high in the installation as possible. The roof (or the cover) avoids the unintended filling of the enclosure (for example by external elements of the tree leave, rain, etc., type.) The enclosure 12 extends vertically along an axis Z. The enclosure 12 is at least partially filled with a liquid medium 16, up to a first level 17 (which corresponds to a first height of the enclosure along the axis Z). The liquid medium 16 is preferably water, but it may also be sea water. In this case, it is necessary to make sure that the walls of the enclosure and the elements in the enclosure have received an anti-corrosion treatment beforehand. Although water remains the preferred liquid medium, a person skilled in the art will know, from reading the following text, that it is possible to implement the invention with a different liquid medium compatible with its role which will be described in detail below.

The destruction installation 10 comprises a chamber 18, which is preferably immersed in the liquid medium 16 of the enclosure 12. The chamber 18 is preferably totally immersed in the liquid medium 16. However, it is also possible to envisage having a partially immersed chamber, in which case the chamber 18 would be situated at a greater height of the enclosure 12 with respect to its representation in FIG. 1, such that an upper part of the chamber 18 would be above the first level 17. A chamber 18 positioned towards the bottom of the enclosure has the advantage of being totally immersed. The chamber thus has the benefit that the mass of liquid medium surrounding it contributes to the cooling thereof. Positioned at human height, the advantage is that of allowing the chamber to be filled more easily. Another variant of the installation according to the invention will be presented below with a combustion chamber 18 external to the enclosure 12.

The chamber 18 comprises an inlet 19 opening at one of the lateral walls 13 of the enclosure 12. The inlet 19 is intended to supply the immersed chamber 18 with waste 11 to be destroyed by combustion in the immersed chamber 18. Of course, during operation of the installation, the inlet 19 is hermetically sealed. The chamber 18 also comprises an outlet 20 intended to discharge products resulting from the combustion. The chamber 18 may be called dry chamber. This is because, although it is immersed in the liquid medium, the inside of the chamber 18 is not in contact with the liquid medium 16. The inlet 19 ensures an access to the outside of the installation so as to be able to introduce pyrotechnic waste to be destroyed into the chamber 18 in an entirely safe manner.

The chamber 18 advantageously comprises an integrated ignition system, which is reusable for initiating the combustion of the waste 11. Direct access to the chamber from the inlet 19 and an adequate opening width facilitate the loading of the waste to be destroyed. The internal volume of the chamber 18 is advantageously adapted to the packaging of the waste. The (total or even partial) immersion of the chamber in the liquid medium has the benefit of cooling of the walls of the chamber 18. The inside of the chamber 18 may be lined completely or in part with an internal thermal protection coating. The installation according to the invention may also comprise several independent chambers 18 in the same enclosure 12 in order to increase the waste disposal capacity.

The installation further comprises a discharge line 21 extending between a first end 22 and a second end 23 of the discharge line 21. The first end 22 is connected to the outlet 20 of the immersed chamber 18. The connection between the contents of the chamber 18 and the inside of the line 21 is therefore hermetic. The products resulting from the combustion in the chamber 18 are necessarily oriented in the line 21. The second end 23 of the line 21 is situated in the liquid medium 16, preferably in the vicinity of the base 14 of the enclosure 12. As shown in FIG. 1, the discharge line 21 rises, between its first end 22 and its second end 23, up to a second level 24 which is higher than the first level 17 (and which is higher than the upper part of the chamber 18 in the event that the chamber 18 is partially immersed. In other words, in the event of a semi-immersed chamber 18, the first end 22 connected to the outlet 20 of the chamber 18 has to be lower than the second level 24. In the event of an outlet above the level 24, the inverted siphon is not necessary), the discharge line 21 being configured to discharge, at the second end 23 in the liquid medium 16, gases and volatile solid residues that are produced in the immersed chamber 18 during combustion. In other words, the discharge line 21 is an inverted siphon or gooseneck. The first end 22 of the line 21 is hermetically connected to the chamber 18, and the second end 23 of the line 21 is bathed in the liquid medium. The discharge line transfers pollutants (contamination products in the form of gas, possibly products in the form of liquid, and volatile solid residues) from the chamber 18 to the liquid medium 16. At the end of combustion of the waste 11, inert (for example metallic) residues may remain in the chamber 18. Specifically, it may be noted that non-volatile, and non-pyrotechnic, solid residues may remain inside the chamber. It is possible for these residues to be treated by a conventional or specialized route depending on their nature.

The height of the liquid medium 16 in the enclosure 12 has to be high enough to ensure an optimal residence time for the gaseous species generated by the combustion in order to promote the dissolution in the water of all the matter and all the gases which are soluble in water. Solid residues (for example metallic particles) are, for their part, conducted, by settling phenomenon, so as to be deposited at the base of the enclosure 12.

Thus, the invention consists in burning waste 11 in the dry chamber 18. Optionally, the chamber 18 may comprise, at the outlet 20 which is connected to the first end 22, or more generally in the line 21 between the first end 22 and the second end 23, a device of the valve or gate type and/or a convergent/divergent device for ensuring a certain overpressure of the gases in the chamber 18 in order to promote proper ignition and proper combustion of the waste. The arrangement of the chamber 18 facilitates the use of the installation because it offers direct access to the chamber for depositing waste 11 therein. The combustion of the waste 11 generates gases and solid residues, and also a slight overpressure (depending on the combustion, and therefore the waste 11). The release of gas and the overpressure drive combustion products into the line 21, which is dry at a first branch from its first end, and which plunges into the liquid medium 16 at a second branch towards its second end 23. The pressure of the combustion gases in the line 21 pushes water present in the line 21 towards the second end 23 of the line 21. During their travel in the line 21, the gases and solid particles are introduced into the liquid medium 16, first in the second branch of the line then in the enclosure 12. The effectiveness of the method according to the invention rests mainly on the residence time, in the liquid medium 16, of the combustion products released during combustion, the residence time of the combustion products in the liquid medium being primarily a function of the depth of the liquid medium in the enclosure. The intended aim is to be able to contain, within the enclosure containing the liquid medium in which the chamber 18 in which the combustion takes place is immersed, the greater portion of the gaseous (hydrochloric acid for example), liquid and solid (organometallic salts, etc.) chemical species which are generated by the combustion of the waste 11, the retention of these combustion products being realized by various physico-chemical and thermodynamic mechanisms such as dissolution, condensation or quenching mechanisms.

The discharge line 21 plays an important role since it ensures the transition between the immersed dry chamber 18 and the liquid medium 16. It is in this line that the transfer of gases and volatile solid residues from a gaseous environment to a liquid environment takes place. Moreover, the discharge line 21 forms a buffer between the liquid medium 16 and the chamber 18. The portion thereof (preferably with a U shape) between the two branches, portion situated above the first level 17 (that is to say the upper surface of the liquid medium 16 in the enclosure 12), ensures an air volume which provides an air block making it possible to avoid backflow effects of a part of the liquid medium towards the chamber 18 once combustion has ended.

In one embodiment of the invention, the destruction installation may comprise a gas injector 30 connected to the inlet 19 of the immersed chamber 18. The gas injector 30 is configured to inject inert gas, preferably nitrogen, and/or air into the immersed chamber 18, as a function of the nature of the waste 11. Alternatively, the destruction installation according to the invention may comprise several injectors 30, some being dedicated inert gas injectors, and others being air injectors. The injection of inert gas during the waste combustion cycle allows better combination of the pollutants in the liquid medium. The injection of inert gas also contributes to the overpressure which aids in the discharge of gases towards and in the discharge line. At the end of the cycle, the injection of air makes it possible to perform a flushing operation so as to discharge remaining gases in order to avoid anoxia of operators who open the chamber 18 at the inlet 19. Lastly, the injector 30 may also be configured to inject, prior to the end of the cycle, oxygen or air so as to ensure complete combustion of the waste.

It should be noted that the gas injector 30 is shown in all of the figures illustrating the installation according to the invention. However, although its presence is advantageous, it is optional.

In another embodiment, the discharge line 21 may optionally comprise a non-return valve 70 disposed at the second end 23, the non-return valve 70 comprising a valve element 71 configured to be movable between a closed valve position which prevents liquid medium 16 from flowing back into the immersed chamber 18, and an open valve position in which gases and volatile solid residues produced in the immersed chamber 18 during combustion are discharged in the liquid medium 16. The non-return valve 70 makes it possible to avoid backflow effects of a part of the liquid medium towards the chamber 18 once combustion has ended (notably when an operator opens the inlet 19 of the chamber 18). Specifically, the valve element 71 is pushed towards its open position by the gases and the overpressure which are generated during combustion, and which are potentially supplemented by the injection of inert gas, and combustion products can exit the line 21 at its second end 23. The valve 70 may also have an (optional) function of modulating the pressure in the chamber in order to improve combustion in the chamber 18. At the end of the cycle, there is no longer any overpressure from the chamber 18, the valve element 71 closes the line 21, such that water (or any other liquid medium considered) cannot come back towards the chamber 18.

The table below illustrates, by means of observations carried out during the destruction of solid propellant of the composite type, an example of chemical species generated during combustion of solid propellant.

| Chemical species released | | | Mass fractions present in the combustion gases | Mechanisms observed during the treatment |
|---|---|---|---|---|
| Abbreviation | Name | States | | |
| CO | Carbon monoxide | Gaseous | 21.2% | No reaction in contact with the liquid medium (in this case water) in the enclosure. Rises to the surface and is discharged in gaseous form. |
| $CO_2$ | Carbon dioxide | Gaseous | 2.8% | Species soluble in water. The residence time leads to the transformation of $CO2$ into carbonic acid $HCO3^-$ |
| HCl | Hydrochloric acid | Gaseous | 20.2% | Species highly soluble in water. Transformation to the liquid state within the enclosure |
| H2 | Hydrogen | Gaseous | 2.1% | Species not soluble in water. Rises to the surface and is discharged in gaseous form. |
| $H_2O$ | Water | Gaseous | 9.4% | Gaseous species which condenses in liquid form within the enclosure |
| $N_2$ | Nitrogen | Gaseous | 8.3% | Species not soluble in water. Does not recombine with |

| Chemical species released | | | Mass fractions present in the combustion gases | Mechanisms observed during the treatment |
|---|---|---|---|---|
| Abbreviation | Name | States | | |
| Al$_2$O$_3$ | Alumina | Liquid | 34% | atmospheric oxygen at the surface of the liquid medium Species condensed in solid form in contact with water. Trapped by settling at the base of the enclosure |
| FeCl$_2$ | Ferrous chloride | Liquid | 1.5% | Species soluble in water. Remains trapped in the enclosure |

Certain gaseous species do not undergo any transformation during their passage in the liquid medium, such that they rise to the surface and gather together in the volume of the enclosure 12 between the first level 17 and the roof 15. The gaseous species that do not undergo any transformation can potentially pose a danger to any operators, notably carbon monoxide. Furthermore, the release of gas into the atmosphere is subject to regulations, notably the regulation for industrial incinerators which sets the maximum release threshold, regulation materialized by prefectoral decrees relating to the operation of the industrial site in question in which the method is implemented. Hence, in a preferred implementation form, the roof 15 of the enclosure 12 comprises an opening 80 intended to discharge gases which are discharged in the liquid medium 16 and which are not incorporated in the liquid medium 16. It also avoids the creation of an ATEX zone (that is to say an explosive atmosphere) between the surface of the liquid 17 and the roof 15. The gases can thus be discharged to the atmosphere provided that their concentration is lower than the maximum release threshold. Alternatively, the installation according to the invention may comprise a suction device (extractor hood) which is connected to the opening 80 and which makes it possible to recover these gaseous species and treat them by catalytic treatment or any other suitable treatment.

Figure 2:
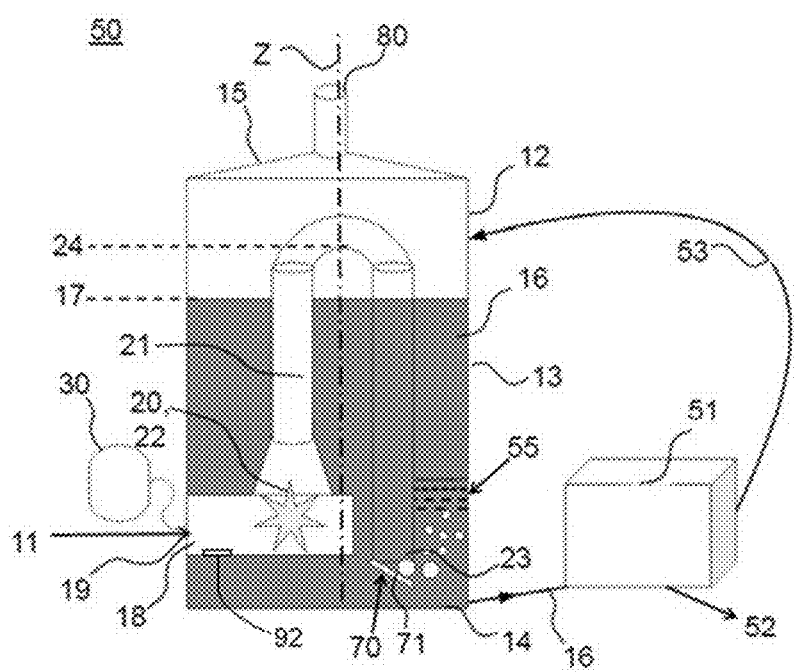
FIG. 2 schematically shows one embodiment of the destruction installation according to the invention.

FIG. 2 schematically shows one embodiment of the destruction installation 50 according to the invention. In this embodiment, the installation 50 comprises the same elements (optional or not) as the installation 10 described above. It further comprises a treatment unit 51 for treating the liquid medium 16, said treatment unit being configured to be supplied with liquid medium 16 in which gases and volatile solid residues produced during combustion are incorporated/recombined and to dispense dry inert matter (after evaporation) 52 (sludge with a high concentration of water being able to be discharged by conventional routes for treating waste) and treated water 53, which is preferably intended to be re-injected into the enclosure 12 as liquid medium 16. The treatment unit 51 aims to treat the liquid medium which is contained in the enclosure 12 and the composition of which has been modified due to the incorporation of pollutants (by chemical recombination or in the form of sludge as a result of the deposition of certain initially solid residues). The treatment unit makes it possible to recover elements dissolved in the liquid medium. The liquid medium of modified composition is sent (continuously or periodically), by means of a network of pipes and pumps, to the treatment unit 51 within which the liquid medium is freed to the greatest possible extent of products from the combustion.

The treated water 53 may be discharged as waste water, or else it may be re-used in the enclosure as liquid medium 16 cleaned of all pollutants. The transfer may be direct (continuous) or via a transfer buffer tank (optional).

The solid species, generally in the form of sludge, can also be directed to the treatment unit 51 and will be able to be captured in the treatment unit or an auxiliary unit. Alternatively, these solid products which are accumulated, under the effect of gravity, at the base of the enclosure 12 during successive cycles can be discharged periodically to an auxiliary storage tank. This waste is then separated and recycled in an appropriate manner. It is the object either of recovery operations with regard to recyclable products, or of landfilling for non-recyclable ultimate waste. For example, metallic elements can be recycled in a foundry for the production of new metallic components.

In one embodiment, the installation 50 may comprise a device 55 for increasing the contact time between the discharged gases and the liquid medium 16. This device 55 is optional. It makes it possible to optimize the gas/water (or more generally gas/liquid medium) exchanges and thus permits greater recombination of the gases in the liquid medium. In FIG. 2, the device 55 comprises perforated gratings which are disposed at different levels (according to height) in the enclosure 12. Advantageously, following the path of the gases, starting from the lower part of the enclosure and rising towards the upper part, the gratings successively have perforations of smaller and smaller diameter. This has the result that large gas bubbles are broken into smaller bubbles, which are in turn split into even smaller bubbles so as to allow a greater gas/liquid medium contact surface and thus to facilitate the incorporation of the gaseous species into the liquid medium. Of course, the device 55 can also be envisaged in the installation 10 shown in FIG. 1.

Figure 3:
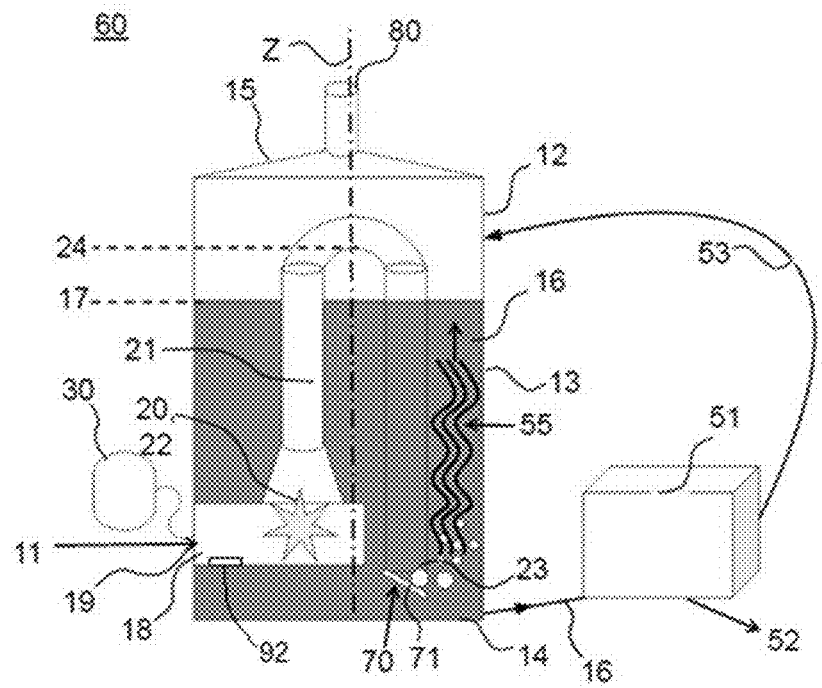
FIG. 3 schematically shows another embodiment of the destruction installation according to the invention.

FIG. 3 schematically shows another embodiment of the destruction installation 60 according to the invention. The installation 60 is identical to the installation 50, the only difference being the device 55 for increasing the contact time between the discharged gases and the liquid medium 16. In this embodiment, the device 55 takes the form of baffles. The baffles impose a longer path for the gaseous species during the phase of rising to the surface. This results in a longer contact time between the gases and the liquid medium. The baffles may be parallel to one another, or else they may be further spaced apart in the lower part of the enclosure so as to accommodate larger gas bubbles, and thus to ensure the required flow rate of the gases at the outlet of the line 21. The device 55 may be a mixture of gratings (as shown in FIG. 2) and baffles (as shown in FIG. 3) in order to increase the contact surface (bubble size) and a transfer time in the liquid 16. Of course, the device 55 can also be envisaged in the installation 10 shown in FIG. 1.

Figure 4:
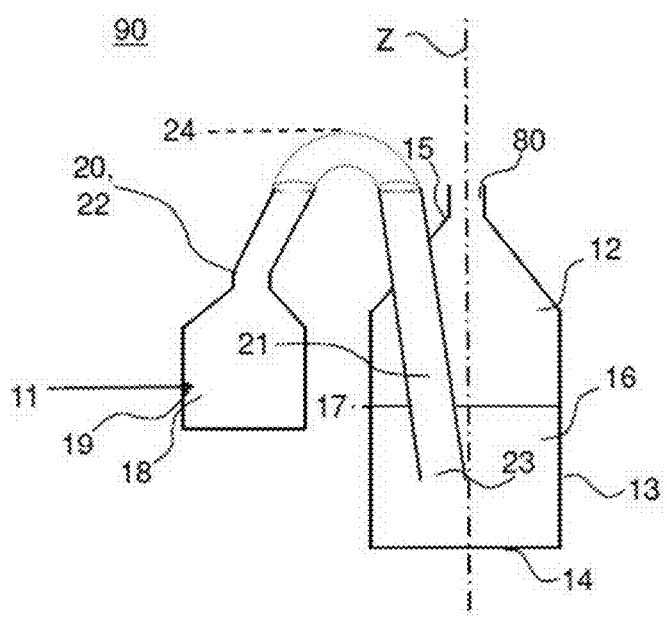
FIG. 4 schematically shows another embodiment of the destruction installation according to the invention.

FIG. 4 schematically shows another embodiment of the destruction installation 90 according to the invention. The installation 90 comprises an enclosure 12 delimited by lateral walls 13, a base 14 and a roof 15, the enclosure 12 being at least partially filled with a liquid medium 16, preferably water, up to a first level 17. The installation 90 comprises a chamber 18 comprising an inlet 19 intended to supply the chamber with waste 11 to be destroyed by combustion in the chamber 18, and an outlet 20. The installation 90 also comprises a discharge line 21 extending between a first end 22 and a second end 23, the first end 22 being connected to the outlet 20 of the chamber 18, the second end 23 being situated in the liquid medium 16, preferably in the vicinity of the base 14 of the enclosure 12, the discharge line 21 rising, between its first end 22 and its second end 23, to a second level 24 which is higher than the first level 17, the discharge line 21 being configured to discharge, at the second end 23 in the liquid medium 16, gases and volatile solid residues which are produced in the chamber 18 during combustion.

Thus, the installation 90 differs from the installation 10 shown in FIG. 1 in that the chamber 18 has been moved outside the enclosure 12. The principle of discharging combustion gases and volatile solid residues is still effected with the discharge line 21, from the outlet 20 of the chamber to the liquid medium 16 in the enclosure 12, and according to the same principles as presented above. To this end, the enclosure 12 comprises an opening through which the line 21 passes, the opening allowing the passage of the line 21 obviously being rendered hermetic by means known to a person skilled in the art.

A person skilled in the art understands that the installation 90, with a remote chamber, can comprise all the variants presented above in the context of an installation with an immersed or semi-immersed chamber.

Figure 5:
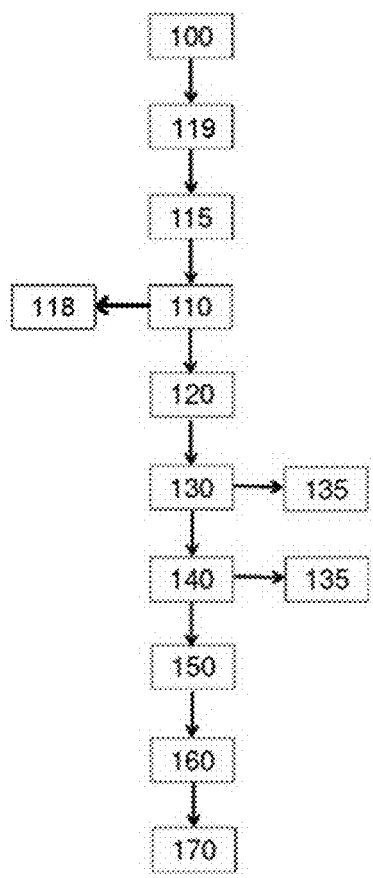
FIG. 5 shows a flow diagram of the steps of a method for destroying pyrotechnic waste according to the invention.

FIG. 5 shows a flow diagram of the steps of a method for destroying pyrotechnic waste according to the invention. The method for destroying waste comprising at least traces of energetic materials, preferably propellant, comprises the following steps defining a destruction cycle:
- supplying (step 100) waste to be destroyed to a chamber disposed in or in the vicinity of an enclosure delimited by lateral walls, a base and a roof, the enclosure being at least partially filled with a liquid medium, preferably water, up to a first level of the enclosure, the chamber being able to be immersed in the liquid medium or remote in the vicinity of the enclosure;
- combusting (step 110) the waste to be destroyed in the chamber, generating gases and solid residues, accompanied by an overpressure;
- discharging (step 120) the gases and volatile solid residues via a discharge line extending between a first end and a second end, the first end being connected to an outlet of the chamber, the second end being situated in the liquid medium, preferably in the vicinity of the base of the enclosure, the discharge line rising, between its first end and its second end, to a second level which is higher than the first level;
- bringing (step 130) the discharged gases and volatile solid residues into contact with the liquid medium at the second end of the discharge line;
- incorporating (step 140) a portion of the gases and the volatile solid residues into the liquid medium.

The destruction method according to the invention may further comprise, after the step 140 of incorporating a portion of the gases and the volatile solid residues into the liquid medium, a step 150 of treating the liquid medium, delivering dry matter (after evaporation) and treated water, which is preferably intended to be re-injected into the enclosure as liquid medium. Alternatively, or in addition, the method of the invention may comprise a step of flushing the enclosure with waste water after treatment 150.

Advantageously, the destruction method according to the invention comprises a step 115 of injecting inert gas, preferably nitrogen (or air as a function of the nature of the waste), into the chamber 18 during the destruction cycle, and more precisely between the step 100 of supplying the chamber 18 with waste 11 to be destroyed and the step 110 of combusting the waste to be destroyed. The injection of inert gas is useful for destroying waste of the propellant type comprising both a fuel and an oxidizer. The injection of inert gas makes it possible to reduce the oxygen content in the chamber 18, and this limits the creation of compounds other than those from the combustion of propellant. Thus, fewer residues are to be dissolved in the liquid 16. Step 115 occurs after the waste to be destroyed has been inserted in the chamber 18 and after the opening 19 has been closed ensuring a certain degree of tightness of the chamber 18.

At the end of the cycle of destruction by combustion, the destruction method according to the invention advantageously comprises a step 118 of injecting air into the chamber 18 making it possible to discharge combustion gases and certain volatile solid residues to the discharge line 21 and the liquid medium 16. The injection of air also makes it possible to re-establish the oxygen content in the chamber such that an operator opening the chamber at the end of the destruction cycle is not subjected to an anoxic atmosphere.

It is possible for the waste 11 to be wet when it is introduced into the chamber 18 in step 100. Advantageously, between step 100 and combustion step 110, it is then advantageous for the waste 11 to be dried out during a step 119 in order to facilitate combustion thereof. The drying-out may be effected by raising the temperature of the chamber 18 to a temperature lower than that for self-ignition of the waste 11. It is for example possible to raise the temperature of the chamber to a temperature of the order of 100° C. for example by induction or by means of an electrical heating resistor. More generally, it is advantageous to employ any heating system 92 which does not generate any chemical compounds during use thereof for raising the temperature of the chamber 18. It is for example useful to avoid the use of fossil fuels, such as kerosene, liable to generate combustion gases which would increase the quantity of gas to be dissolved in the liquid medium.

Advantageously, the means for raising the temperature of the chamber for the drying-out operation is also used to initiate combustion. More precisely, the means for raising the temperature of the chamber can be employed to reach a temperature greater than that for self-ignition of the waste 11, for example of the order of 400° C.

The destruction method according to the invention may comprise a step 135 of increasing the contact time between the discharged gases and the liquid medium after the step 130 of bringing the discharged gases into contact with the liquid medium, during the step 140 of incorporating a portion of the gases and the volatile solid residues into the liquid medium.

Furthermore, the destruction method according to the invention may comprise a step 160 of discharging gases which are discharged in the liquid medium and which are not incorporated in the liquid medium through an opening in the roof of the enclosure.

Lastly, the destruction method according to the invention may comprise a step 170 of suctioning gases for catalytic treatment or any other suitable treatment.

The destruction installation and method of the invention have numerous advantages with respect to the prior art. The installation is less bulky. Furthermore, the invention offers the possibility of treating large volumes of waste, either by adaptation of the volume of the chamber or by multiplication of the number of chambers. The method of the invention is less noisy during a destruction cycle. Due to its simplicity of construction, the installation is modular, and it is entirely possible to vary the number of chambers, and also the number of associated treatment units. As is evident from the description of the invention, the method is simple to implement, fine tuning and adjustments are straightforward since there is no complex mechanism to implement. Another important point is that the invention makes it possible to destroy a large spectrum of waste, for example composite or homogeneous propellants, contaminated waste, etc. The waste can be in pure form or with packaging and other non-pyrotechnic materials (metallic or rubber materials, or materials from petroleum products). The principle can also be adapted for other types of pyrotechnic waste that are not mentioned here. More generally, the method of the invention is adapted for treating any waste of which the gas emanations are miscible in a liquid medium (notably water).

It will be apparent more generally to a person skilled in the art that various modifications may be made to the embodiments described above, in the light of the teaching that has just been disclosed to said person. In the claims which follow, the terms used should not be interpreted as limiting the claims to the embodiments set out in the present description, but should be interpreted to include therein all of the equivalents that the claims are intended to cover by virtue of their wording and as may be foreseen by a person skilled in the art on the basis of their general knowledge.

The invention claimed is:

1. An installation for destroying waste comprising at least traces of energetic materials, wherein the installation comprises:
   an enclosure delimited by lateral walls, a base and a roof, the enclosure being at least partially filled with a liquid medium, preferably water, up to a first level;
   a chamber comprising:
      an inlet, said inlet being intended to supply the chamber with waste to be destroyed by combustion in the chamber;
      an outlet;
      the chamber being immersed in the liquid medium of the enclosure, the inlet of the chamber opening at one of the lateral walls of the enclosure,
   a discharge line extending between a first end and a second end, the first end being connected to the outlet of the chamber, the second end being situated in the liquid medium, preferably in the vicinity of the base of the enclosure, the discharge line rising, between its first end and its second end, to a second level which is higher than the first level, the discharge line being configured to discharge, at the second end in the liquid medium, gases and volatile solid residues which are produced in the chamber during combustion.

2. The installation for destroying waste according to claim 1, further comprising a treatment unit for treating the liquid medium, said treatment unit being configured to be supplied with liquid medium wherein gases and volatile solid residues produced during combustion are incorporated and to dispense dry matter and treated water, which is preferably intended to be re-injected into the enclosure as liquid medium.

3. The installation for destroying waste according to claim 1, comprising a gas injector connected to the inlet of the chamber, the gas injector being configured to inject inert gas and/or air into the chamber, the inert gas preferably being nitrogen.

4. The installation for destroying waste according to claim 1, comprising a device for increasing the contact time between the discharged gases and the liquid medium.

5. The installation for destroying waste according to claim 4, wherein the device for increasing the contact time between the discharged gases and the liquid medium comprises perforated gratings which are disposed at different levels in the enclosure; following the path of the gases, starting from the lower part of the enclosure and rising towards the upper part, the gratings successively have perforations of smaller and smaller diameter.

6. The installation for destroying waste according to claim 4, wherein the device for increasing the contact time between the discharged gases and the liquid medium takes the form of baffles.

7. The installation for destroying waste according to claim 1, wherein the discharge line comprises a non-return valve disposed at the second end, the non-return valve comprising a valve element configured to be movable between a closed valve position which prevents liquid medium from flowing back into the chamber, and an open valve position wherein gases and volatile solid residues produced in the chamber during combustion are discharged in the liquid medium.

8. The installation for destroying waste according to claim 1, wherein the roof of the enclosure comprises an opening intended to discharge gases which are discharged in the liquid medium and which are not incorporated in the liquid medium.

9. The installation for destroying waste according to claim 1, further comprising a heating system for heating the chamber, said heating system not generating any chemical compounds during use thereof.

* * * * *